United States Patent [19]

Komatsu

[11] Patent Number: 4,506,273
[45] Date of Patent: Mar. 19, 1985

[54] MULTICOLOR THERMAL TRANSFER RECORDER WITH COLOR DETECTION MEANS

[75] Inventor: Kazuyuki Komatsu, Tokyo, Japan

[73] Assignee: Kabushiki Kaisha Daini Seikosha, Tokyo, Japan

[21] Appl. No.: 502,519

[22] Filed: Jun. 9, 1983

[30] Foreign Application Priority Data

Jun. 22, 1982 [JP] Japan ................... 57-93237

[51] Int. Cl.³ ............................................. G01D 15/10
[52] U.S. Cl. .............................. 346/76 PH; 400/120
[58] Field of Search .................. 346/76 PH; 400/120

[56] References Cited

U.S. PATENT DOCUMENTS 4,188,135  2/1980  Mizutani et al. .................... 400/214
4,250,511  2/1981  Stein et al. .................... 346/76 PH
4,388,628  6/1983  Moriguchi et al. ............. 400/120 X Primary Examiner—E. A. Goldberg
Assistant Examiner—Patrick W. Foster
Attorney, Agent, or Firm—Robert E. Burns; Emmanuel J. Lobato; Bruce L. Adams

[57] ABSTRACT

A multicolor thermal transfer recorder which reduces waste of the ink film by using two or more color detecting devices spaced apart, to determine the position of the ink film in relation to the thermal head. The reduction in waste of the ink film is accomplished by eliminating the automatic intialization advance of the ink film when the power to the recorder is turned on or similar circumstances interrupting the printing operation. The color detecting devices insure that the ink film is in the proper position initially for faithful reproduction of the printer input signal.

1 Claim, 4 Drawing Figures

MULTICOLOR THERMAL TRANSFER RECORDER WITH COLOR DETECTION MEANS

BACKGROUND OF THE INVENTION

The present invention relates to a multicolor thermal transfer recorder and more particularly to the initial setting of an ink film therein.

The multicolor thermal transfer recorder shown in FIG. 1 is a typical recorder performing multicolor recording, the construction thereof will be described hereinunder. Reference numeral 1 denotes a platen on which a recording medium 2 is arranged in a predetermined state. The platen 1 is adapted to feed on the recording medium 2 at a predetermined pitch.

Reference numeral 3 designates an ink film which is pressed between a thermal head 4 and the recording medium 2, and the transfer recording onto the recording medium 2 is performed by means of a head carrier member 5 which generates heat at a predetermined timing while moving in the direction of the arrow X. Reference numeral 6 denotes a supply reel for supplying the ink film 3. The used ink film 3 is taken up in the direction of the arrow a by means of a take-up reel 7. FIG. 2 shows the construction of the ink film. The ink film is coated with yellow 3Y, magenta 3M and cyan 3C consecutively in sequence. The range indicated by the arrow b is the range in the main scanning direction, i.e., the movement range of the head carrier member and the thus maximum recording width. In this case, when the recording medium 2 and the ink film 3 are fixed, after the head carrier member 4 has scanned, for example, the yellow part 3Y which has been recorded, the ink film 3 is fed on by the supply reel 6 until the magenta part 3M thereof is set on the recording medium and, at the same time, the yellow part 3Y is taken up by the take-up reel 7, and then the head carrier member 4 carries out a second scanning. Similarly, the cyan part 3C is scanned by a third scanning. Thus, dots for one line are recorded in multiple colors, and the recording medium 2 is fed on by one pitch in the direction of the arrow Y. Then, in a similar manner, the recording for the next line is carried out. In general, in a multicolor thermal transfer recorder employing three primary colors for a subtractive color process as described above, scanning the colors in the order of yellow, magenta and cyan makes it possible to provide other colors by combinations of the primary colors which have excellent running, brightness, saturation, etc., characteristics.

As described above, in a multicolor thermal transfer recorder of this type, since a plurality of inks in a plurality of colors have been applied consecutively in sequence, when the power to the recorder is turned on, it is necessary that the operator confirms that the yellow part of the ink film is set on the platen so as to cover the recording width completely, if the recording width is not covered completely by the yellow part, the ink film must be fed on until the yellow part is set properly on the platen. Alternatively, the initial setting of the yellow part is generally effected by carrying out an initial feed of the ink film up to the next application of a yellow part, without any confirmation. In such a case, the probability increases that the initial feed will waste a maximum of the ink film for one line. As the number of times of turning on and off the power increases, the labor required for the former initial operation increases unfavorably, and in the latter initial operation, the amount of ink film wasted compared with an identical roll increases disadvantageously.

An object of the present invention is to eliminate the need for supervision, as well as reduce the probability that ink film will be wasted, by judging, when turning on the power, whether or not the recording width is covered by the yellow part and whether or not an initial feed is necessary, by providing a plurality of means for detecting colors at positions separated from each other, thereby removing the above disadvantages.

1: platen, 2: recording medium, 3: ink film, 4: thermal head, 5: head carrier member, 6: supply reel, 7: take-up reel, 3Y: yellow part of ink film, 3M: magenta part of ink film, 3C: cyan part of ink film, 10: light-emitting diode driving circuit unit, 11, 11': logarithmic amplifier circuit unit, 12, 12': band-pass filter, 13: differential amplifier circuit unit, 14: AD converter, 15: control circuit unit, 16: motor, 17: motor driving circuit, $D_1$, $D_2$: light-emitting diode, $PD_1$, $PD_2$: photodiode, CD, CD': color detection circuit unit, R: resistor.

Figure 1:
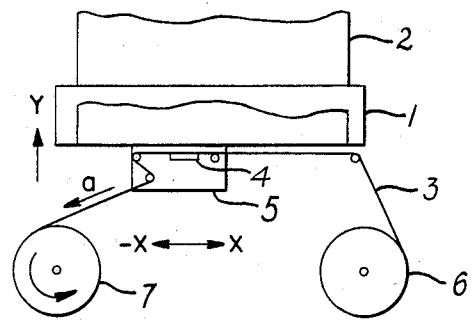
FIG. 1 shows the construction of a multicolor thermal transfer recorder.
Figure 2:
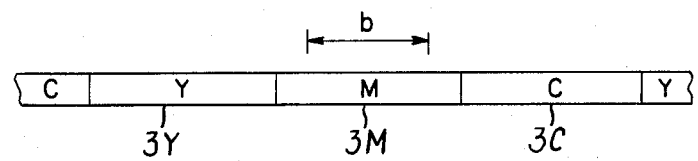
FIG. 2 shows the construction of the ink film therefor.
Figure 3:
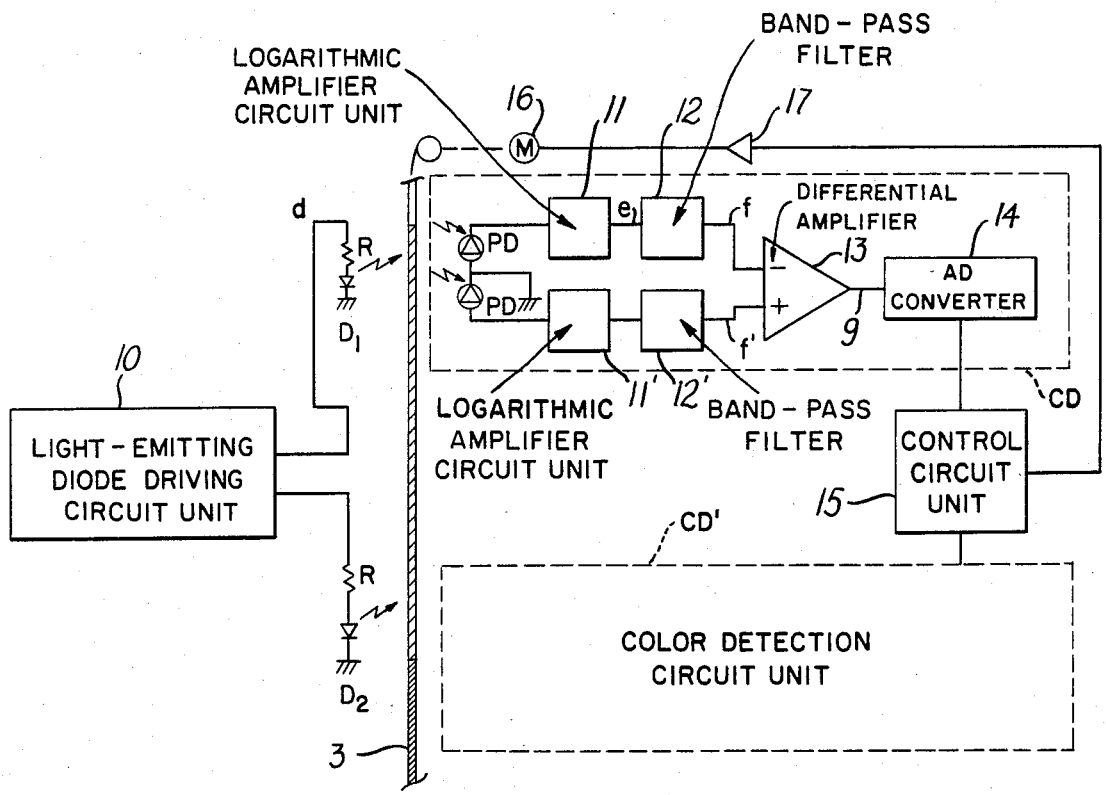
FIG. 3 is a block diagram of an embodiment of the invention.
Figure 4:
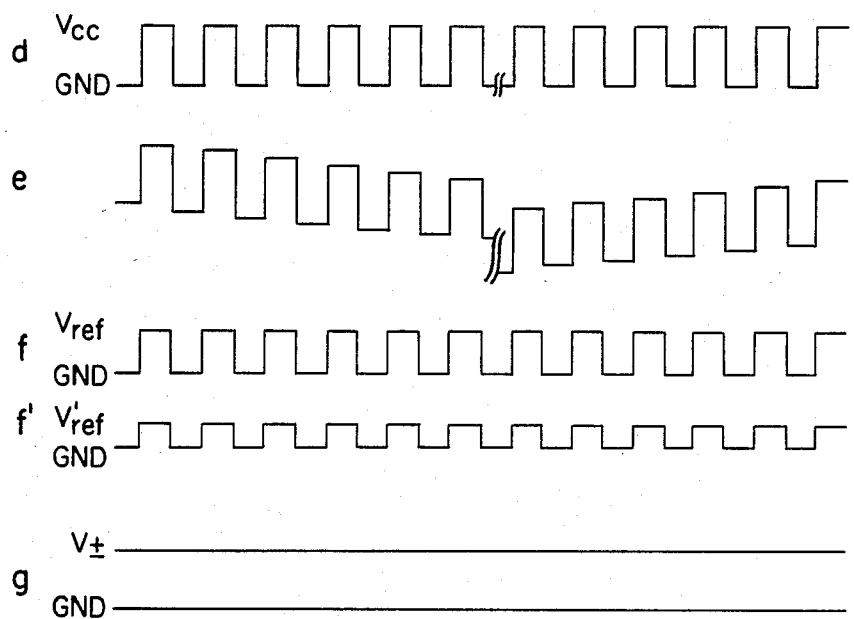
FIG. 4 is a chart showing the essential waveforms in the embodiment of the invention.

An embodiment of the invention will now be described hereinunder with reference to the accompanying drawings. Referring now to FIG. 3 which is a block diagram of an embodiment of the invention reference numeral 10 denotes a drive circuit section for light-emitting diodes $D_1$, $D_2$ which are pulse-driven at 20 KHz. This is designed to remove interference such as that due to sunlight and indoor light sources. The light transmitted through the ink film 3 is received by photodiodes PD, PD' which have different wavelength sensitivities from each other. Signal currents from the photodiodes PD, PD' are passed through logarithmic amplifier circuit units 11, 11' and 20 KHz band-pass filters 12, 12', respectively, in order to remove interference. The band-pass filters 12, 12' are connected to a differential amplifier circuit unit 13. More specifically, since photodiodes with different wavelength sensitivities are paired and disposed at the same position, short-circuit currents thereof change with the color of the ink film. Accordingly, it is possible to judge color from the level of the output voltage of the differential amplifier circuit unit 13 obtained by calculating the ratio of these currents. Reference numeral 14 designates an AD converter circuit which converts a voltage level into a digital signal. Since it is sufficient to discriminate only between yellow, magenta and cyan, only two bits are required. Color signals from a color detection circuit unit CD and a color detection circuit unit CD' having the same construction are supplied to a control circuit section 15. A motor 16 for driving the ink film is controlled through a motor driving circuit 17 by these signals from the color detection circuit units CD, CD'. Accordingly, it is possible to judge easily whether or not an initial feed is necessary by positioning the color detection circuit units CD, CD' at the left and right extremities of the recording width, respectively. FIG. 4 is a chart showing the waveforms at points d, e, f, f' and g of FIG. 3. At point d, the light-emitting diode $D_1$ is pulse-driven at 20

KHz. At point e, interference is added thereto. The frequencies of commercial power sources, 50 Hz or 60 Hz, can produce noise, particularily indoors. The noise is removed by the 20 KHz band-pass filters 12, 12'. At points f and f', the signals are pulses having voltages $V_{ref}$ and $V'_{ref}$ in accordance with the color of the ink film 3, and a voltage level is obtained at point g.

As it has been described above, according to the invention, color detection circuit units are positioned at the left and right extremities of the recording width in the main scanning direction, respectively. Therefore, when turning on the power, it is possible to judge whether or not the recording width is covered completely by the yellow part, and whether or not an initial feed is necessary, and effect the initial setting of the ink film automatically. Thereby, the need for labor can be eliminated, and at the same time it is possible to reduce the probability that ink film will be wasted. Accordingly, the invention is very advantageous.

I claim:

1. In a multicolor thermal transfer recorder for transferring records onto a recording medium by selectively heating an ink film made of a thin base material, on which heat-melting inks of plural colors having a low melting point are coated one after the other consecutively, with a thermal head, wherein a plurality of means for detecting the colors of said ink film are disposed at positions separated from each other.

* * * * *